United States Patent Office 3,234,286
Patented Feb. 8, 1966

3,234,286
ACETYLATION OF NAPHTHALENES
Frederick R. Lawrence, Broomall, Pa., assignor to E. I. du Pont de Nemours and Company, Wilmington, Del., a corporation of Delaware
No Drawing. Filed Oct. 27, 1961, Ser. No. 148,054
6 Claims. (Cl. 260—592)

The present invention relates generally to a process for the production of β substituted naphthalenes. More particularly, this invention relates to a process for acetylating naphthalene in the β position of the ring.

β-Substituted naphthalenes are useful for a number of purposes. For example, 2,6-naphthalenedicarboxylic acid is useful as a polymer intermediate for making both linear polymers suitable for textiles and crosslinked compositions suitable for casting compositions. Such a composition is presently expensive because of production costs since no suitable hydrocarbon has been found which will, when oxidized, yield the desired 2,6-naphthalene-dicarboxylic acid in major proportions in a system from which it can be easily separated. The dimethylnaphthalenes, for example, exist as a mixture of isomers which are very difficult to separate and which cannot be isomerized satisfactorily to the 2,6-isomer.

Acetyl substituted naphthalenes are particularly useful for oxidation to the corresponding acids because the acetyl group is intermediate in oxidation state between an alkyl group and an acid group.

One method previously reported for directing the entrance of acetyl groups into the aromatic ring concerns the use of nitrobenzene as a solvent for Friedel-Crafts reactions; however, the use of nitrobenzene has several disadvantages. Nitrobenzene is very toxic. Also, when products are recovered by dilution of nitrobenzene with water, emulsions are formed which are very difficult to separate. Also the boiling point of nitrobenzene is so high (210° C.) that recovery of the solvent by distillation is difficult and hazardous unless conducted under reduced pressure. Further, the freezing point of nitrobenzene is high enough (5.7° C.) that reactions cannot be carried out at low temperatures where the direction of substitution to the β position of naphthalene is most rewarding and most practical.

The prior art also teaches the use of nitromethane as a solvent for Friedel-Crafts reactions for directing substitution into the β positions of naphthalene to obtain 2-methyl-6-acetyl-naphthalene; however, nitromethane is very dangerous to use because of its high ratio of oxidizing groups ($NO_2$) to carbon.

In accordance with the present invention a process for acetylating naphthalene is provided which comprises reacting naphthalene with an acetylating agent in the presence of a solvent, said solvent consisting essentially of 2-nitropropane, and a Friedel-Crafts catalyst.

The most preferred modification of the instant invention resides in the acetylation of methyl-substituted naphthalene having at least one free β position.

The term acetylation as used herein is meant to define a process in which the

group is substituted into the naphthalene ring.

The temperature at which the acetylation is carried out may vary widely. In general, however, the lower the temperature the greater is the percentage of 2,6-isomer in the product but the slower the reaction. The lower temperature limit of the process is at the freezing point of 2-nitropropane which is −93° C. but below temperatures of −30° C. the process is not economical because of the reaction rates. The upper temperature limit is controlled by the decomposition of naphthalene used. In general, excessive decomposition of the naphthalene leading to tarry products and unwanted isomers starts at 100° C. The preferred temperature range for the present process is between −10° C. and 70° C. The reaction time is dependent on the reaction temperature.

The reaction can be carried out partially to completion, i.e., incomplete consumption of the naphthalene, and the unreacted naphthalene recovered and recycled or it can be carried essentially to completion with complete usage of the naphthalene.

The use of 2-nitropropane as a solvent for the Friedel-Crafts reaction is of prime importance in the instant process. For example, 2-nitropropane is only 1/50 as toxic as nitrobenzene (based on the maximum allowable concentration for an eight hour exposure). Substitution occurs in the β positions of naphthalene in its presence which is essential to the present invention. Additionally, it does not form emulsions with water when products are recovered from an aqueous medium. It boils at 120° C. and is, therefore, easy to recover by distillation at atmospheric pressure.

Friedel-Crafts catalysts are widely known for use in alkylating and acylating hydrocarbons. $FeCl_3$ is preferred where recovery of the catalyst is not required. Hydrogen fluoride, boron trifluoride and mixtures thereof, although more expensive than the ferric chloride, can be recovered easily by distillation and reused. Other catalysts which are usable are zinc chloride and aluminum chloride. Aluminum bromide and antimony chloride are also satisfactory; however, they are expensive and thus not very attractive for economic reasons at the present time. The proportion of catalyst used in the instant acetylating process will be at least one mole per mole of ketone obtained. Greater quantities of catalyst can be used for speeding up the reaction but this is only optional.

For the purpose of this application an acetylating agent is defined as a compound containing a transferrable

group. The acetylating agent may be any one of the group comprising acetic anhydride, acetyl chloride, ketene, and isopropenyl acetate. Others such as acetyl bromide are operable but expensive at the present time. The quantity of acetylating agent used in the instant process is at least one mole per mole of naphthalene if the reaction is carried out until complete conversion of the naphthalene occurs. If only partial conversion of the naphthalene is desired lesser quantities may be used.

In order to more fully illustrate and to promote a greater understanding of the instant invention, the following examples are given. They are given merely to serve as an illustration and should not be construed as limiting the scope of the instant invention. In all examples the constituents are given in parts by weight.

*Example 1*

To a mixture of 2-nitropropane (200 parts) and $AlCl_3$ (66.7 parts) and 36.6 parts of 2-methylnaphthalene is added 25 parts of isopropenyl acetate. The mixture is heated with stirring at 75° C. for 3 hours. After cooling the mixture is poured into 200 parts of ice water containing 10 parts of concentrated HCl. The organic layer is separated and distilled. The total yield of acetylated methylnaphthalenes is 81.5% of which 64% is the 2,6 isomer. The acetone recovered from the distillation as the by-product is recycled by reacting it with ketene to form isopropenyl acetate which is used for acetylation.

Examples 2, 3, 4

Using the same quantity of 2-nitropropane, the procedure of Example 1 is used under the conditions defined in the table below:

| Example No. | Catalyst | Amount in parts | Acetylating Agent | Amount in parts | Parts of 2-methyl-naphthalene | Temp. (° C.) | Time (hrs.) | Total Yield, percent | Percent 2,6 Isomer |
|---|---|---|---|---|---|---|---|---|---|
| 2 | FeCl$_3$ | 40.5 | Acetyl chloride | 27.5 | 42.6 | 0 | 1.25 | 78.6 | 89 |
| 3 | FeCl$_3$ | 81 | Ketene | 42 | 71.0 | −10 | 4.5 | 78.7 | 87 |
| 4 | FeCl$_3$ | 81 | Acetic anhydride | 25.5 | 35.5 | −5 | 1 | 68.4 | 88 |

When a procedure similar to Example 1 is run using 200 milliliters of 1,1,2,2-tetrachloroethane as the solvent instead of 2-nitropropane, the total yield of product is only 55.4% of which 50% is the 2,6 isomer. When 200 milliliters of nitrobenzene are used as the solvent in place of 2-nitropropane under similar conditions the yield is only 27.2% of a product containing 72% of the 2,6 isomer.

These comparative results show that 2-nitropropane exerts more of a directive influence on acetylation than other common solvents for Friedel-Crafts reactions.

Many equivalent modifications will be apparent to those skilled in the art from a reading of the above description without a departure from the inventive concept; therefore, there is no desire to be limited by anything other than the following claims.

What is claimed is:

1. A process for acetylating the β position of a naphthalene ring having at least one free β position, comprising contacting the naphthalene with Friedel-Crafts catalyst and acetylating agent in a solvent consisting essentially of 2-nitropropane at a temperature of from about −30° C. to below the decomposition temperature of the naphthalene reactant, the acetylating agent being selected from the group consisting of isopropenyl acetate, ketene, acetyl chloride and acetic anhydride.

2. The process of claim 1 wherein the Friedel-Crafts catalyst is a member of the group consisting of ferric chloride, hydrogen fluoride, boron trifluoride, zinc chloride, and aluminum chloride.

3. The process of claim 1 wherein the naphthalene is methyl-substituted naphthalene.

4. The process of claim 1 wherein the naphthalene is naphthalene.

5. The process of claim 1 wherein the naphthalene is 2-methylnaphthalene.

6. The process of claim 1 wherein the temperature is between −10° C. and 70° C.

References Cited by the Examiner

UNITED STATES PATENTS 2,404,100  7/1946  Schmerling.

OTHER REFERENCES

Bassilios et al.: Bull. Soc. Chim., France, vol. 21, pp. 72–9 (1954).

Gore: Chem. Reviews, vol. 55, pp. 233–44 (1955).

Thomas: Anhydrous Aluminum Chloride in Organic Chemistry, pp. 274–5 (1941).

LEON ZITVER, *Primary Examiner.*

CHARLES B. PARKER, *Examiner.*